United States Patent [19]

Simms et al.

[11] Patent Number: 5,334,974
[45] Date of Patent: Aug. 2, 1994

[54] PERSONAL SECURITY SYSTEM

[76] Inventors: James R. Simms, 9405 Elizabeth Ct., Fulton, Md. 20759; Charles G. Simms, 3310 Hall's Creek La., Owings, Md. 20736; Daniel D. Moore, Jr., 108 Midhurst Rd., Baltimore, Md. 21212

[21] Appl. No.: 831,901

[22] Filed: Feb. 6, 1992

[51] Int. Cl.⁵ .......................................... G08G 1/123
[52] U.S. Cl. ..................................... 340/990; 340/988; 340/995; 340/426; 342/457; 364/460; 379/59
[58] Field of Search ............... 340/988, 989, 990–993, 340/539, 426, 995, 574, 434, 905, 286.13, 286.14; 180/287; 379/59, 37, 38, 39, 40, 44, 45; 342/457, 357; 364/424.04, 449, 460

[56] References Cited

U.S. PATENT DOCUMENTS

| | | | |
|---|---|---|---|
| Re. 32,856 | 2/1989 | Millsap et al. | 340/539 |
| 3,568,161 | 3/1971 | Knickel . | |
| 3,683,114 | 8/1972 | Egan et al. | 179/5 |
| 3,848,254 | 11/1974 | Drebinger et al. . | |
| 3,986,119 | 10/1976 | Hemmer, Jr. et al. . | |
| 4,002,983 | 1/1977 | Kavalir et al. . | |
| 4,152,693 | 5/1979 | Ashworth, Jr. | 340/990 |
| 4,369,426 | 1/1983 | Merkel | 340/989 |
| 4,428,057 | 1/1984 | Setliff et al. | 364/521 |
| 4,596,988 | 6/1986 | Wanka . | |
| 4,644,368 | 2/1987 | Mutz | 364/424.04 |
| 4,651,157 | 3/1987 | Gray et al. | 342/457 |
| 4,697,281 | 9/1987 | O'Sullivan . | |
| 4,701,760 | 10/1987 | Raoux | 340/993 |
| 4,718,080 | 1/1988 | Serrano et al. | 379/59 |
| 4,728,922 | 3/1988 | Christen et al. . | |
| 4,731,613 | 3/1988 | Endo et al. | 342/357 |
| 4,750,197 | 6/1988 | Denekemp et al. | 379/58 |
| 4,791,572 | 12/1988 | Green, III et al. | 364/449 |
| 4,804,937 | 2/1989 | Barbiaux et al. . | |
| 4,812,820 | 3/1989 | Chatwin | 340/518 |
| 4,821,309 | 4/1989 | Namekawa | 379/58 |
| 4,825,457 | 4/1989 | Lebowitz | 379/40 |
| 4,833,477 | 5/1989 | Tendler | 364/449 |
| 4,852,146 | 7/1989 | Hatchcock et al. | 379/58 |
| 4,868,859 | 9/1989 | Sheffer | 379/39 |
| 4,891,761 | 1/1990 | Gray et al. | 364/452 |
| 4,896,370 | 1/1990 | Kasparian et al. | 455/77 |
| 4,904,983 | 2/1990 | Mitchell | 340/426 |
| 4,907,159 | 3/1990 | Mauge et al. | 364/436 |
| 4,910,493 | 3/1990 | Chambers et al. | 340/426 |
| 4,924,417 | 5/1990 | Yuasa | 364/550 |
| 4,996,703 | 2/1991 | Gray | 379/40 |
| 5,055,851 | 10/1991 | Sheffer | 340/539 |
| 5,081,667 | 1/1992 | Drori et al. | 379/59 |
| 5,109,399 | 4/1992 | Thompson | 340/286.14 |
| 5,119,301 | 6/1992 | Shimizu et al. | 364/449 |
| 5,128,979 | 7/1992 | Reich et al. | 379/39 |
| 5,155,689 | 10/1992 | Wortham | 364/460 |

*Primary Examiner*—Brent Swarthout
*Attorney, Agent, or Firm*—Royal W. Craig

[57] ABSTRACT

A fully automatic personal security system which combines the advantages of worldwide LORAN-C or GPS navigation with the substantially worldwide communication capabilities of a cellular telephone or communication satellite. The security system comprises a mobile unit which communicates emergency data including position coordinates, and a central dispatch station which receives the emergency data and accurately displays all necessary emergency information superposed on a digitized map at a position corresponding to the location of the mobile unit.

27 Claims, 9 Drawing Sheets

PERSONAL SECURITY SYSTEM

BACKGROUND OF THE INVENTION

1. Field of the invention

The present invention relates generally to a security system for protecting vehicles and, more importantly, the people travelling therein. In particular, the present invention is a device for expediting a response by the appropriate authorities whenever and wherever the personal security of a mobile person is compromised. The device includes a mobile communication unit and a central station. The mobile communication unit is transported with the mobile person and is triggered by the occurrence of a variety of personal security conditions to establish cellular telephone contact with the central station. The mobile communication unit then communicates longitude and latitude coordinate acta, emergency, ana personal information to the central station. All pertinent information is conveniently displayed to an operator at the central station in a manner which permits the most efficient dispatching possible of the proper responding agents to administer the proper security measures.

2. Description of the Background

Considering this nation's widespread uprise in violent crimes, a person compromises his or her personal security each and every time he or she undertakes travel. The threat to personal security is most appreciable when the travel is by motor vehicle. Our public highways are becoming more congested and the frequency of roadside emergency situations is likewise increasing.

Emergency situations may arise as the result of an accident or vehicle breakdown. The emergency may be compounded by inclement weather, a lack of communication ability, a disabling injury, etc. For the duration, the motorist is completely prone to theft or violent attack. It follows that a prompt emergency response from police, paramedics, the fire department, or other service organization is essential for maintaining personal security.

Generally, a vehicle operator must find the nearest accessible telephone, dial an emergency number, and attempt to provide landmark or navigational data for the benefit of the authorities. These tasks are difficult when performed under the stress of an emergency, and they can be impossible where a disability or injury exists.

Cellular telephones provide a partial solution in the form of a convenient communication link to authorities in times of emergencies. For this reason, cellular car phones are now widely considered to be a prerequisite for personal security.

Unfortunately, a cellular telephone only provides the communication link. It will not of itself perform the task of communicating. This task is left to the vehicle operator. Consequently, the operator must perform the following tasks:

1. remember the telephone number of the proper authorities or service providers;
2. dial the number; and
3. convey landmark or navigational data to direct the respondents to the site.

The time it takes to complete the above-described tasks needlessly jeopardizes the personal security of the operator. This is especially true when the operator has no idea of his or her location and cannot provide the requisite navigational data and/or emergency situation information to the authorities. More often, the instructions and information provided are inaccurate, misleading, or misunderstood.

A number of prior art devices have been proposed for automating the dispatch of the proper authorities to a vehicle in an emergency situation. For example, U.S. Pat. No. 3,568,161 issued to Knickel discloses a vehicle locator system comprising a network of sensors tied to a central command station. A vehicle travelling amidst the sensors emits a code to the sensors which is indicative of the identity of the vehicle. The code is received at the nearest sensor station, which in turn signals the central command station that it has received the code. The location of the vehicle is then displayed at the central station. The central command station includes a display panel with a number of lights placed on a map at locations corresponding to each sensor.

U.S. Pat. No. 4,596,988 issued to Wanka likewise discloses a remote-control tracking transmitter and tracking support network of remote stations. As a vehicle passes through the network, the vehicle communicates with a remote station. The remote station in turn transmits location data to a base station which plots the location on a map plotter.

U.S. Pat. No. 4,904,983 issued to Mitchell discloses a theft alarm system for vehicles including an alarm sensor, an auto-dialing mechanism, and a cellular telephone. The alarm sensor activates the auto-dialing mechanism to seize the cellular telephone and dial a central station. A recorder then broadcasts a two-part message over the cellular telephone. The message includes fixed information relating to the identity of the automobile and variable information relating to the location of the automobile. The variable information may be input by the operator through a microphone when the vehicle is to be left unattended.

U.S. Pat. No. Re. 32,856 issued to Millsap et al. discloses an alarm system in which an alarm condition causes a cellular transceiver to automatically transmit a telephone call to a central station. The invention incorporates a cellular telephone link in a fixed alarm system. The use of a cellular telephone eliminates the need for telephone lines. Hence, cutting of the telephone lines will not result in negation of the alarm signal. A circuit is also shown for determining a particular zone in which the alarm condition exists and for transmitting alarm information to the central station via the cellular telephone.

In addition to the above-described alarm systems, a number of improvements have been developed for particular components of the alarm systems.

For instance, U.S. Pat. No. 3,683,114 issued to Egan et al. discloses an automatic dialing and reporting system which is responsive to an alarm condition. The Egan et al. device seizes a telephone line and initiates automatic transmission over the telephone line.

U.S. Pat. No. 4,428,057 issued to Setliff et al. discloses an electronic system for use in a marine environment. The system includes a plurality of digitized maps which are stored in a database for display on a video terminal. "The purpose of this invention is to provide a more efficient use of the operator's time by automatically correlating and monitoring the data" (Column 1 lines 55–57). The displayed map may be compressed or expanded to meet the demands of the operator. In addition, a LORAN-C or other positioning device may be coupled to the system and the LORAN-C coordinate data may be correlated and displayed at the proper location of the map.

Despite the above-described improvements in the field of tracking and navigation, it is important to note that the prior art generally teaches the protection of chattels as opposed to people. For example, the prior art devices will prevent theft, tampering, and other encroachments on property interests, and they will provide information on a vehicle. However, the prior art does not adequately protect the personal security interests of the passenger(s).

More specifically, too much effort is required of the passenger in an emergency situation and too little information is provided to the authorities to insure a prompt and efficient response. Personal security demands a fully automated yet economical system for summoning an emergency response in accordance with the specific personal needs of the individual.

SUMMARY OF THE INVENTION

It is, therefore, an object of the present invention to provide a personal security system which quickly and accurately provides a central dispatch operator with emergency information displayed on digitized map in a format which allows efficient dispatching of emergency assistance to a mobile person(s).

It is another object of the present invention to provide the central dispatch operator with personal information as well as vehicle-specific information for all potential operators of the vehicle.

It is another object of the present invention to provide a fully automatic personal security system and communication protocol which is operative under the most severe circumstances to automatically summon an emergency response in accordance with the specific personal needs of the mobile person.

It is still another object of the present invention to provide a personal security system as described above which may be operated under less severe circumstances to allow the mobile person to manually summon road service or other assistance.

It is another object of the present invention to provide a personal security system as described above which allows the central dispatch operator to selectively establish two-way voice contact with the mobile person and which gives the central dispatch operator remote control over various functions of the vehicle.

It is yet another object of the invention to combine the advantages of long-range navigation systems such as LORAN-C or Global Position Satellite (GPS) with the extensive communication capabilities of a cellular telephone or communications satellite to yield a practical personal security system with the above-described emergency assistance capabilities.

According to the present invention, the above-described and other objects are accomplished by providing a method for dispatching help to a mobile entity. The method comprises the steps of storing an identifier in a mobile unit, outfitting a mobile entity with the mobile unit, storing identification information relating to the mobile entity at a central station, activating the mobile unit upon occurrence of an alarm condition to determine a position of the mobile entity and to generate a code indicative of the alarm condition, the identifier, and the position of the mobile entity, transmitting the code to a central station, and processing the code at the central station to display the position of the mobile entity on a digitized map. The alarm condition and identity of the mobile entity are superposed on the map at a point corresponding to the location of the mobile entity.

In addition, an apparatus for monitoring a mobile entity in accordance with the above-described method is disclosed. The apparatus comprises the mobile unit, which further includes a programmable memory containing identification information characteristic of the mobile entity, a keypad for allowing manual entry of various help requests, a LORAN-C receiver for providing position information, and a processor connected to the programmable memory, to the push buttons, and to the LORAN-C receiver. The processor is activated upon occurrence of an alarm condition to input position coordinates from the LORAN-C receiver, and to compose a digital code corresponding to the alarm condition, to the identification information, and to the position coordinates. The mobile unit also includes a cellular telephone or other communication device (such as a communication satellite) connected to the processor through a first communication circuit which communicates the digital code to a central dispatch station via the cellular phone. A central dispatch station is also disclosed. The central dispatch station comprises a second communication circuit for receiving the digital code from the mobile unit, a programmable memory containing identification information relating to the mobile entity, a processor connected to the second communication circuit and memory for decoding the digital code, and for correlating the position of the mobile entity to a point on a digitized map, and a video display connected to the processor for displaying the digitized map with the alarm condition and identification information superposed at the appropriate point.

It should be noted that the invention is not limited to the security of a motorist. Rather, the invention can be employed with any type of vehicle, including boats and planes. Further, the invention is capable of protecting the security of pedestrians, animals, and inanimate objects. The invention can pin-point the location of anything capable of carrying a mobile unit.

BRIEF DESCRIPTION OF THE DRAWINGS

The above-described and other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
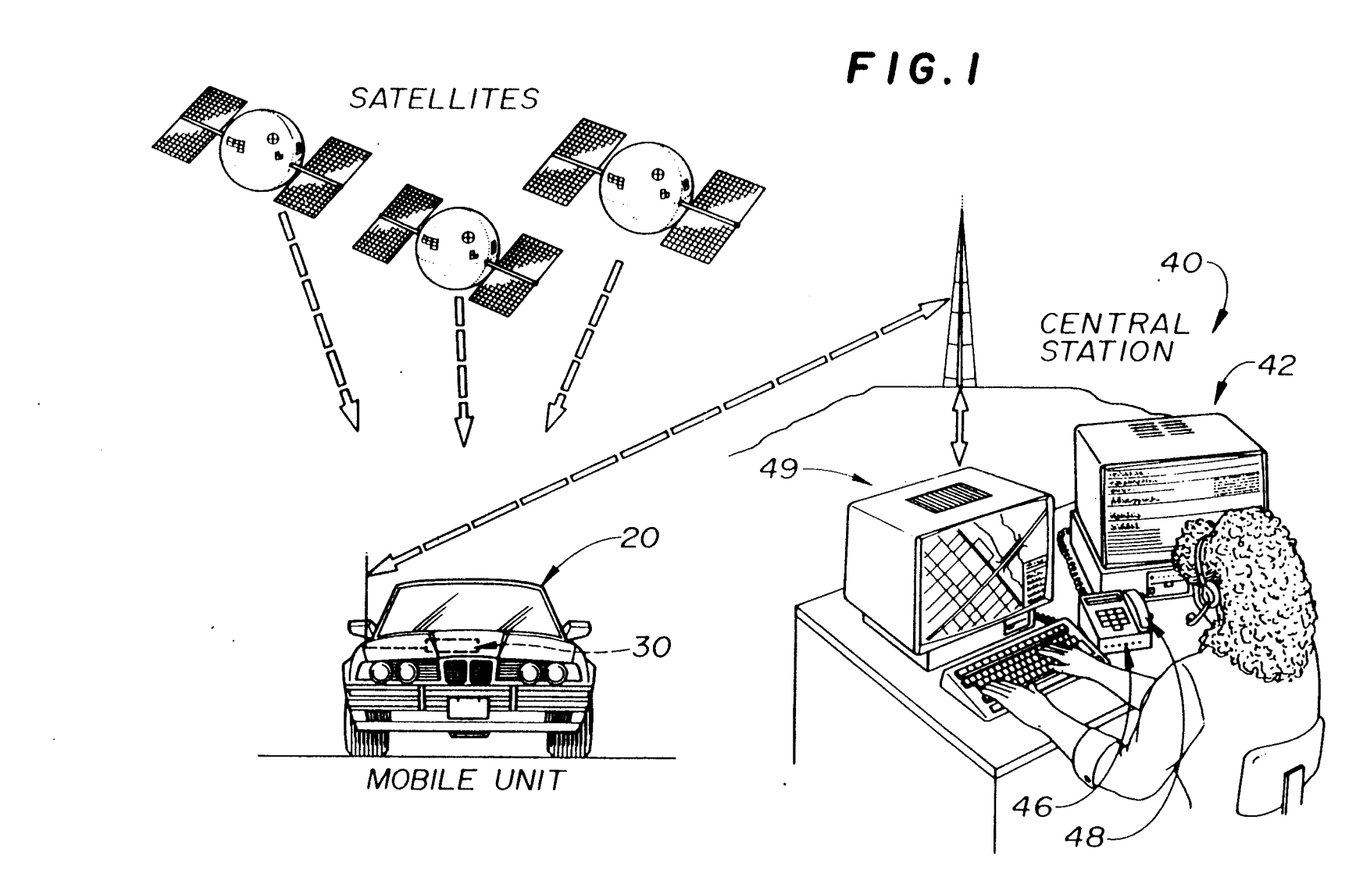
FIG. 1 is a perspective drawing of a personal security system in accordance with the preferred embodiment of the present invention.

Referring now to FIG. 1, a personal security system according to the present invention generally includes a mobile security assembly 30 which is transported along with a mobile person. Mobile security assembly 30 is shown in FIG. 1 to be incorporated in an automobile 20. Alternatively, mobile security assembly 30 may be incorporated in any other type of vehicle, or may be hand-carried by a pedestrian.

The personal security system also includes a central dispatch station 40 which is manned by a central dispatch operator.

In general operation, the mobile security assembly 30 is automatically triggered by the occurrence of a variety of personal security conditions or is manually operated to initiate contact with the central dispatch station 40. Once a communication link is established, the mobile security assembly 30 communicates a hierarchy of longitude and latitude coordinate data, as well as emergency and personal information to the central dispatch station 40. The information is conveniently displayed to the dispatch operator.

It is the combination of the coordinate data hierarchy and the automatic communication protocol, as well as the specific content of the information and the unique format in which it is displayed at central station 40 which allows the operator to dispatch the proper responding agents. The response is more efficient, more accurate, and it is based on foreknowledge of the proper security measures to be taken.

Figure 2:
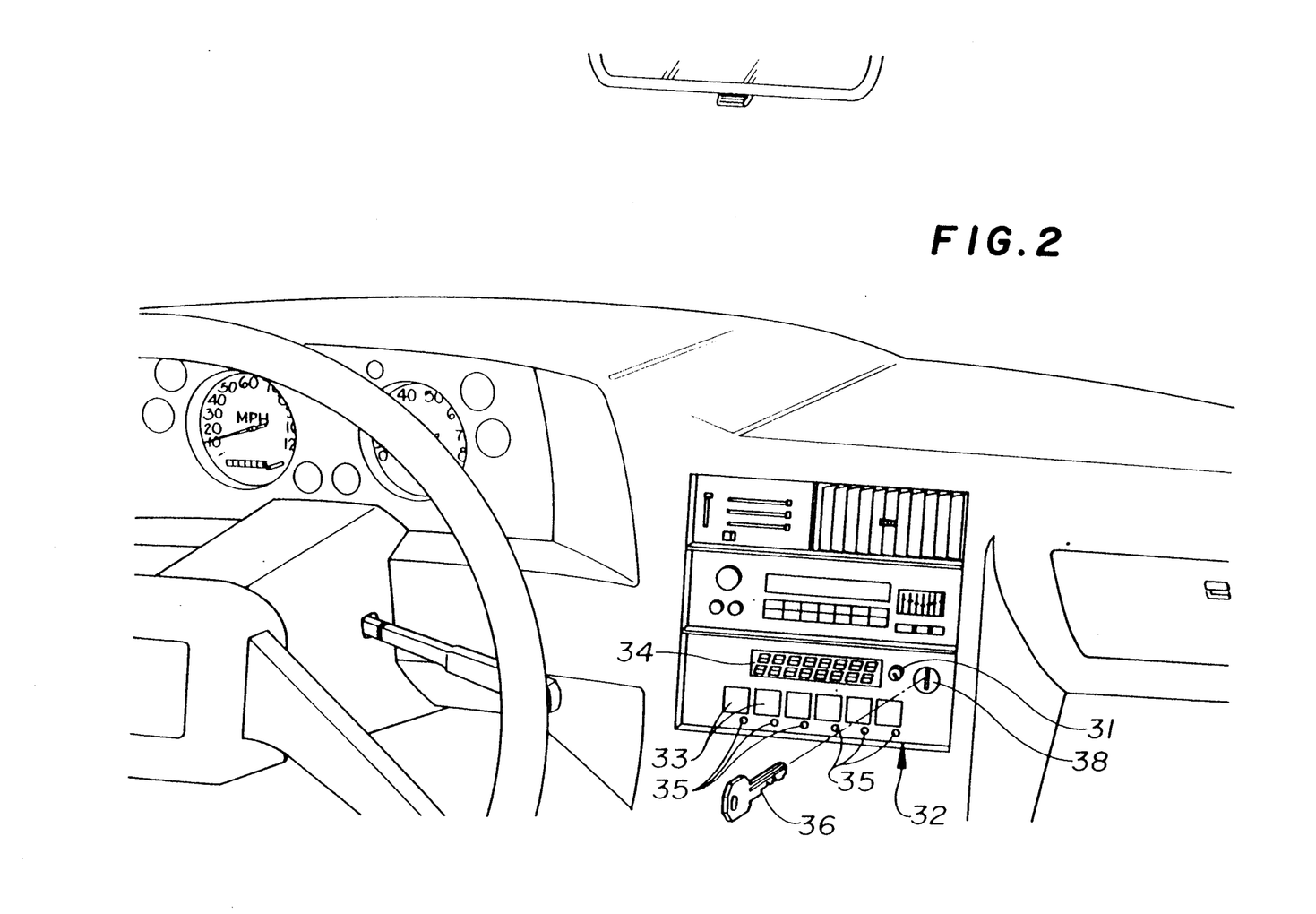
FIG. 2 is a close-up perspective drawing of a mobile unit 32 which is included in the mobile security assembly 30 of FIG. 1

As shown in FIG. 2, the mobile security assembly 30 further includes a mobile unit 32 which may be mounted in the dashboard of the automobile in much the same manner as a conventional AM/FM radio. The anterior of mobile unit 32 includes a plurality of push buttons 33, indicator lights 35, alphanumeric display 34 and contrast adjustment knob 31, and a data keyslot 38 which receives a personal identification key 36.

The push buttons 33 are used to manually initiate and confirm specific help requests or a self-test.

Data keyslot 38 and personal identification key 36 provide information regarding the identity and characteristics of the mobile person. Personal information such as name and personal account number is digitally stored in a memory which is resident on the key 36. This personal information is read by the keyslot 38 when key 36 is inserted therein. A wealth of supplemental personal information may also be stored directly on key 36 or may be stored in a central dispatch station 40 database. The supplemental personal information may include social security number, names of relatives to contact in an emergency, special medical needs, and/or medical records, etc.

In addition to the personal information stored on key 36, system-specific information such as the serial number of the mobile unit 32 is stored in a memory which is resident in mobile unit 32. Supplemental vehicle-specific information such as the vehicle identification number, make, model, color, etc., may likewise be stored in mobile unit 32 or in a central dispatch station 40 database.

It is essential to the invention that personal, system and/or vehicle-specific data are made available to the central dispatch operator regardless of the many potential operators of the vehicle. The personal identification key 36 is an innovative solution. The quality of the combined information and the manner in which it is displayed at central dispatch station 40 allows the dispatch operator to coordinate a prompt and comprehensive response to any personal security situation which may befall the mobile person. The response capability is far superior to any existing security system.

Figure 3:
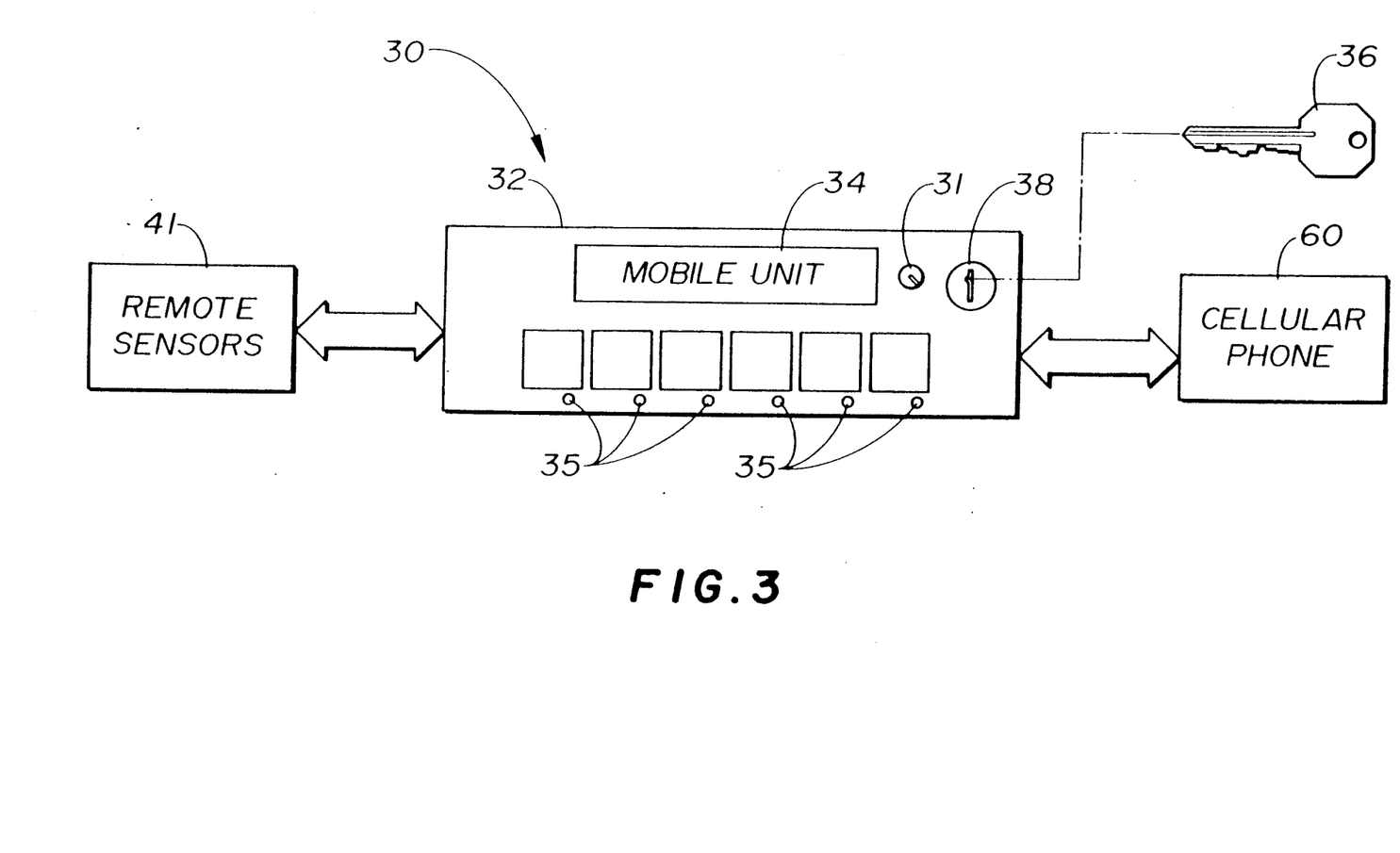
FIG. 3 is a block diagram of the circuitry in mobile security assembly 30 of FIG. 1.

FIG. 3 is a block diagram of the mobile security assembly 30 of FIG. 1. In addition to mobile unit 32, the assembly includes a cellular telephone 60 and a plurality of remote sensors 41 each connected to the mobile unit 32.

Cellular telephone 60 may be any conventional cellular telephone. It should be appreciated by one skilled in the art that other types of communication devices such as satellite transceivers may perform the function of the cellular telephone 60 and may easily be substituted therefor. Hence, the present invention should not be construed as limited to a cellular telephone.

Remote sensors 41 automatically initiate specific help requests upon detecting various alarm conditions. For instance, remote sensors 41 may include smoke or heat detectors for detecting a fire within the vehicle, a tamper switch or motion detector for detecting a possible theft of the vehicle, an impact detector for detecting a collision, a sensor for detecting activation of a vehicle air-bag, and any of numerous other sensor types for automatically detecting a wide variety of personal security situations. The above-described and many other sensors are well-known in the art and commercially available.

In the preferred embodiment of mobile unit 32, there are six push buttons 33 which are mounted on the face of mobile unit 32. These allow the mobile person to manually enter and confirm that a personal security situation has arisen. Push buttons 33 are conventional momentary switches (preferably touch-sensitive). Four of the push buttons 33 are dedicated to each of four common types of emergency assistance, i.e., fire, paramedics, police, and roadside service and are clearly labeled with the specific type of assistance. In addition, one of the push buttons 33 is marked "ENTER" and is provided to confirm the use of the emergency push buttons. This dual-entry convention insures that the emergency push buttons are not inadvertently depressed. Alternatively, if a single-entry convention is desired, the "ENTER" push button can be configured to cancel the use of an emergency push button within a predetermined amount of time. Finally, the sixth push button is marked "TEST" and is provided to initiate a self-test of the mobile security assembly 30.

Mobile unit 32 includes a display 34, which is preferably a liquid crystal display (LCD) for displaying messages to the mobile person. A contrast adjustment knob 31 is mounted proximate to the display 34.

A panel of indicator lights 35 is provided under push buttons 33 to indicate which of the push buttons have been depressed. In addition, an optional piezoelectric element or other audible signal may be incorporated to sound when a push button has been depressed.

Keyslot 38 is also mounted on the face of mobile unit 32 for convenient insertion of personal identification key 36. As explained, both are commercially available data entry components. For instance, Keyceptical ® KC4210PCB and Serial Data Key ® DK4000 by Datakey ® may be used. Up to 512 bytes of personal information may be stored directly on the personal information key 36. At a minimum, the name and personal account number are stored to identify the mobile person.

The general method of operation of the personal security system is described as follows.

Mobile unit 32 remains in a stand-by mode at all times before the personal identification key 36 has been inserted in keyslot 38. While in stand-by mode, mobile unit 32 remains partially operational and continuously polls remote sensors 41 to detect vehicular security conditions. Position locator 70 also remains on during stand-by mode and communications through cellular telephone 60 to central dispatch station 40 may be established. Hence, the location of the vehicle can be monitored at all times at central dispatch station 40. However, the push buttons 33 are disabled in stand-by mode.

A person entering the vehicle must first insert a personal identification key 36 in order to fully activate the mobile security assembly 30. When key 36 has been inserted, digitally encoded personal information is automatically read from the key 36 and is stored within mobile unit 32 for subsequent communication to the central dispatch station 40. The manual push buttons 33 become operational and mobile unit 32 enters full security mode.

When in full security mode, a help request may be entered manually at push buttons 33 or may be automatically detected at a remote sensor 41. In either case, the mobile unit 32 dials the telephone number of central station 40. When a cellular communication link is established, the mobile unit 32 transmits an array of digitally encoded data. The transmitted data is received by central dispatch station 40. The central dispatch station 40 processes the data and displays all pertinent information to a dispatch operator. The information is displayed in the form of a quickly recognizable symbol such as a shield (for police), a fire (for the fire department), a cross (for medical assistance), or a tow-truck (for roadside service). The symbol appears superposed on a digitized map at a position which corresponds to the location of the mobile entity. Both the vehicle-specific and personal information is displayed adjacent to the symbol. Central dispatch station 40 provides a zoom function to allow the operator to reduce or enlarge the specific area of the digitized map in which the emergency symbol appears. For instance, the dispatch operator may begin with a general map of the United States and the emergency symbol would indicate a state in which an emergency has occurred. The dispatch operator may then zoom in on a particular city, then area, and finally, the street on which the mobile entity 20 is proceeding. It has been found that these display capabilities greatly assist the dispatch operator in directing the proper authorities to the exact location of the vehicle for emergency assistance.

An important feature of the personal security system is a voice mode which allows the operator of the central dispatch station 40 to switch from digital (serial) communication to voice communications at any time. In voice mode, the operator can provide essential instructions to the mobile person prior to the arrival of the responding agents, or the operator can query the mobile person to acquire any additional information which may be useful. Voice mode is a useful feature when the mobile person signals a need for service. The central dispatch operator can further determine the appropriate type of service.

Another important feature is tone recognition which can be utilized while in voice mode to give the central dispatch operator direct control over selected vehicle functions. By depressing touch-tone telephone 48 keys while in voice mode, the central dispatch operator can sound various tones. The mobile unit 32 is provided with the capability of recognizing these tones and controlling various vehicle functions in accordance therewith. This feature is extremely useful in an emergency when, for instance, the vehicle 20 is obscured. Electromagnetic, visual or audible signals can be emitted to help the responding authorities locate the vehicle and mobile person. Also, if tampering with the vehicle is detected by one of the remote sensors 41, the microcontroller 310 or operator of the central dispatch station 40 can activate one of the relays in actuator bank 50 to sound the vehicle horn, illuminate the headlights, etc. If an actual theft is detected, the dispatch operator can immediately cut power to the engine.

Figure 4:
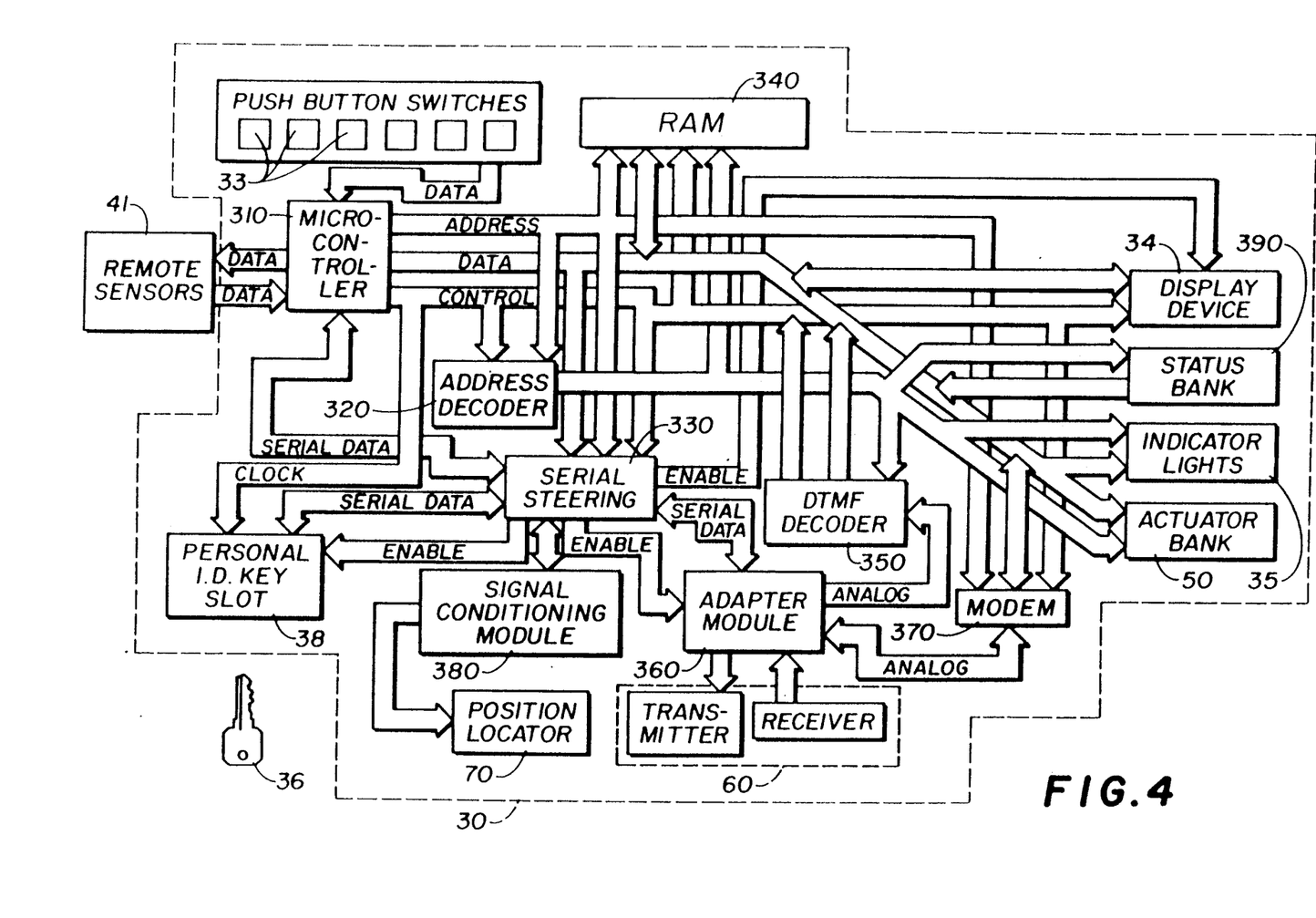
FIG. 4 is a detailed block diagram of the circuitry of FIG. 3.

FIG. 4 shows a detailed block diagram of the mobile security assembly 30 which illustrates the internal circuitry of the mobile unit 32. The internal circuitry includes a microcontroller 310 which receives external inputs from push buttons 33 and remote sensors 41. Microcontroller 310 may be any conventional microcontroller which incorporates an on-board universal asynchronous receiver-transmitter (UART), clock-/timer and internal memory. For example, an Intel® 87C51FB may be used.

The internal circuitry also includes a number of peripheral devices connected to microcontroller 310 via the following bidirectional busses: a CONTROL bus which allows microcontroller 310 to selectively enable the device; a DATA bus which allows microcontroller 310 to transfer data to/from a selected device; and an ADDRESS bus which allows microcontroller 310 to specify a memory address in a selected device. The peripheral device includes a RAM 340 which is connected by the CONTROL, DATA, and ADDRESS busses to microcontroller 310 to serve as working memory, a position locator 70, actuator bank 50, and the following devices which facilitate serial communication and control via cellular telephone 60: a serial steering module 330 which is connected by the CONTROL, DATA, and ADDRESS busses to microcontroller 310 to manage the transfer of serial data between the microcontroller 310 and other serial devices; an adapter module 360 connected between cellular phone 60 and serial steering module 330 which adapts the system for use with a specific brand and model of cellular phone 60; a modem 370 which is connected between the adapter module 360 and microcontroller 310 (via the CONTROL, DATA, and ADDRESS busses) for asynchronous serial communication; and a Dual Tone Multifrequency (DTMF) decoder 350 for sensing tones communicated to cellular phone 60 and generating control bit patterns in response thereto for operating actuator bank 50.

Serial steering module 330 is comprised of one or more conventional programmable logic arrays (PALs) such as, for example, 16L8 PALs. The serial steering module 330 directs serially-encoded input received from the UART internal to microcontroller 310 to the adapter module 360, personal identification keyslot 38, or signal conditioning module 380 in accordance with control data provided by the microcontroller 310.

RAM 340 is a conventional 8 K by 8 static random access memory.

The Dual Tone Multifrequency (DTMF) decoder 350 is a conventional tone-sensing device for generating control bit patterns in response to selected tones. DTMF decoder 350 is enabled by microcontroller 310 when a voice mode request is sent by the central dispatch operator. Once in voice mode, tones of various frequencies are emitted when the operator of central dispatch station 40 depresses the telephone keys. DTMF 350 differentiates the tone and transmits a unique data word in response to each tone. The data may be interpreted by microcontroller 310 or it may be used to directly access and control any of the peripheral devices, including the display device 34 and actuator bank 50.

Modem 370 is preferably a conventional single-chip modem such as a 73K222U from Silicon Systems, Inc. ®.

The display 34 comprises a conventional octal bus transceiver connected via the CONTROL, DATA, and ADDRESS busses to microcontroller 310 and a 20 by 2 character LCD connected to the octal bus transceiver for displaying messages to the mobile person. A potentiometer (not shown) is preferably connected to display 34 to allow contrast adjustment.

Status bank 390 comprises a conventional eight-bit register coupled to the DATA bus and address decoder 320 through an octal line driver. An eight-bit data word is stored in status bank 390 to indicate the status of mobile security assembly 30. Hence, status bank 390 may be accessed from the microcontroller 310 in mobile unit 32. Central dispatch station 40 may then obtain the contents of status bank 390 from microcontroller 310.

The panel of indicator lights 35 comprises six conventional LEDs driven by an octal D-type latch which is in turn coupled to the DATA bus and address decoder 320. The indicator lights 35 indicate which of push button switches 33 has been depressed.

Actuator bank 50 comprises a conventional bank of relays each coupled to the DATA bus through a conventional latch for digital activation. Actuator bank 50 is also coupled to the address decoder 320. The relay coils in actuator bank 50 may be individually activated by microcontroller 310 or directly by the central dispatch station 40. This configuration provides the dispatch operator with direct control over actuator bank 50. The individual relay contacts are series-connected throughout the vehicle electrical system to allow control of selected vehicle functions. For instance, if a medical emergency is communicated to the central dispatch station 40, the dispatch operator can activate one or more relays in actuator bank 50 to trigger an electromagnetic or visual beacon (such as flashing headlights) and/or an audible signal (such as the vehicle horn) to help the responding authorities locate the mobile person when the vehicle is otherwise obscured. Time is often of the essence in such situations, and the time saved by this feature may save a life. Also, if tampering with the vehicle is detected by one of the remote sensors 41, the microcontroller 310 or operator of the central dispatch station 40 can activate one of the relays in actuator bank 50 to sound the vehicle horn, illuminate the headlights, etc. If an actual theft is detected, the dispatch operator can immediately cut power to the engine.

Status bank 390, indicator lights 35, and actuator bank 50 are configured as memory-mapped input/output devices. For this purpose, these devices are coupled to the CONTROL and ADDRESS busses of microcontroller 310 through an address decoder 320. Address decoder 320 enables a selected one of these devices in accordance with an address generated by microcontroller 310. In addition, status bank 390, indicator lights 35, and actuator bank 50 are connected by the DATA bus to microcontroller 310 and, when enabled, may be controlled thereby.

The position locator 70 may be a conventional global positioning system receiver (GPS) such as a Rockwell ®, or alternatively, a LORAN-C system such as a J.E.T ®. In both cases, many suitable models are commercially available. Position locator 70 is used to determine and supply accurate location coordinate data to the mobile unit 32.

The signal conditioning module 380 comprises a conventional logic level converter such as a Maxim ® TTL-to-RS232 converter for interfacing the position locator 70. Signal conditioning module 380 is connected between the position locator 70 and the serial steering module 330 for formatting the latitude and longitude coordinate data from position locator 70 for standard RS-232C serial data transmission.

The adapter module 360 is enabled by the serial steering module 330 to transmit serially-encoded data supplied by modem 370. In addition to straight-through data transmission, the adapter module must adapt the mobile security assembly to the specific brand and model of cellular telephone 60 which is employed. This is because handsets of conventional cellular telephones emit control codes for controlling the operation of the cellular transmitter/receiver. Different cellular telephones employ different control codes and different communication protocols between the cellular handset and transmitter/receiver.

Figure 5:
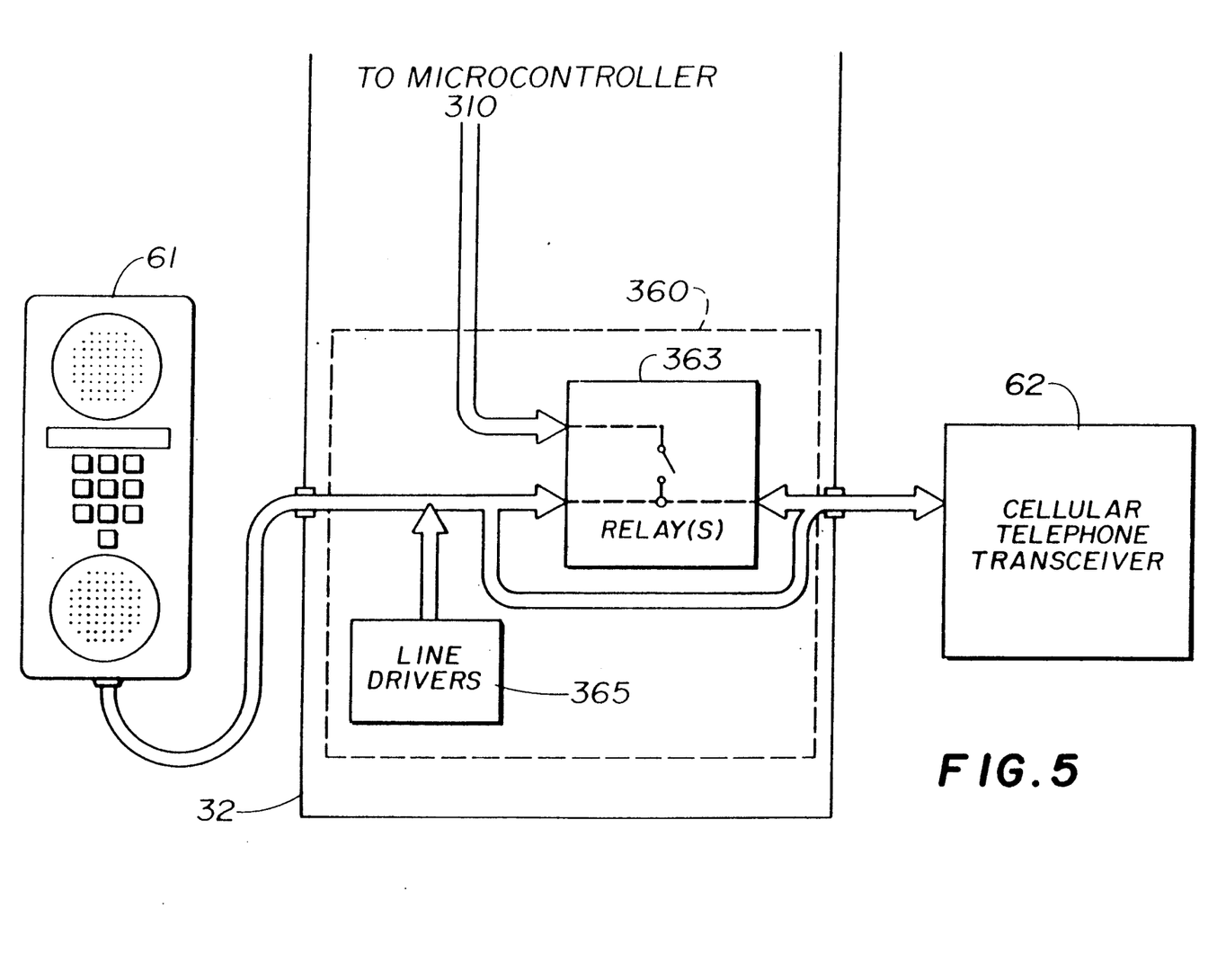
FIG. 5 is a detailed block diagram of the adapter module 360 of FIG. 4.

FIG. 5 illustrates a block diagram of an exemplary adapter module. The cellular telephone handset 61 is unplugged from the cellular transceiver 62 and is instead plugged into a mobile unit 32 connector, which in turn connects to adapter module 360. Likewise, the mobile unit 32 is provided with a connecting cord which is also connected to adapter module 360. The connecting cord is plugged into the cellular transceiver 62. The adapter module 360 acts as an intermediary. Depending on the particular make and model of cellular telephone 60, certain lines are routed straight through and others are routed to a bank of relays 363 such as an OMRON G6A274-P. The single-pole, single-throw relays are controlled by the microcontroller 310. This way, microcontroller 310 may tap into any of the lines from handset 61 in order to accomplish the purposes of the mobile unit 32. A conventional line driver 365 is also provided as necessary for lines requiring additional source current.

Figure 6A:
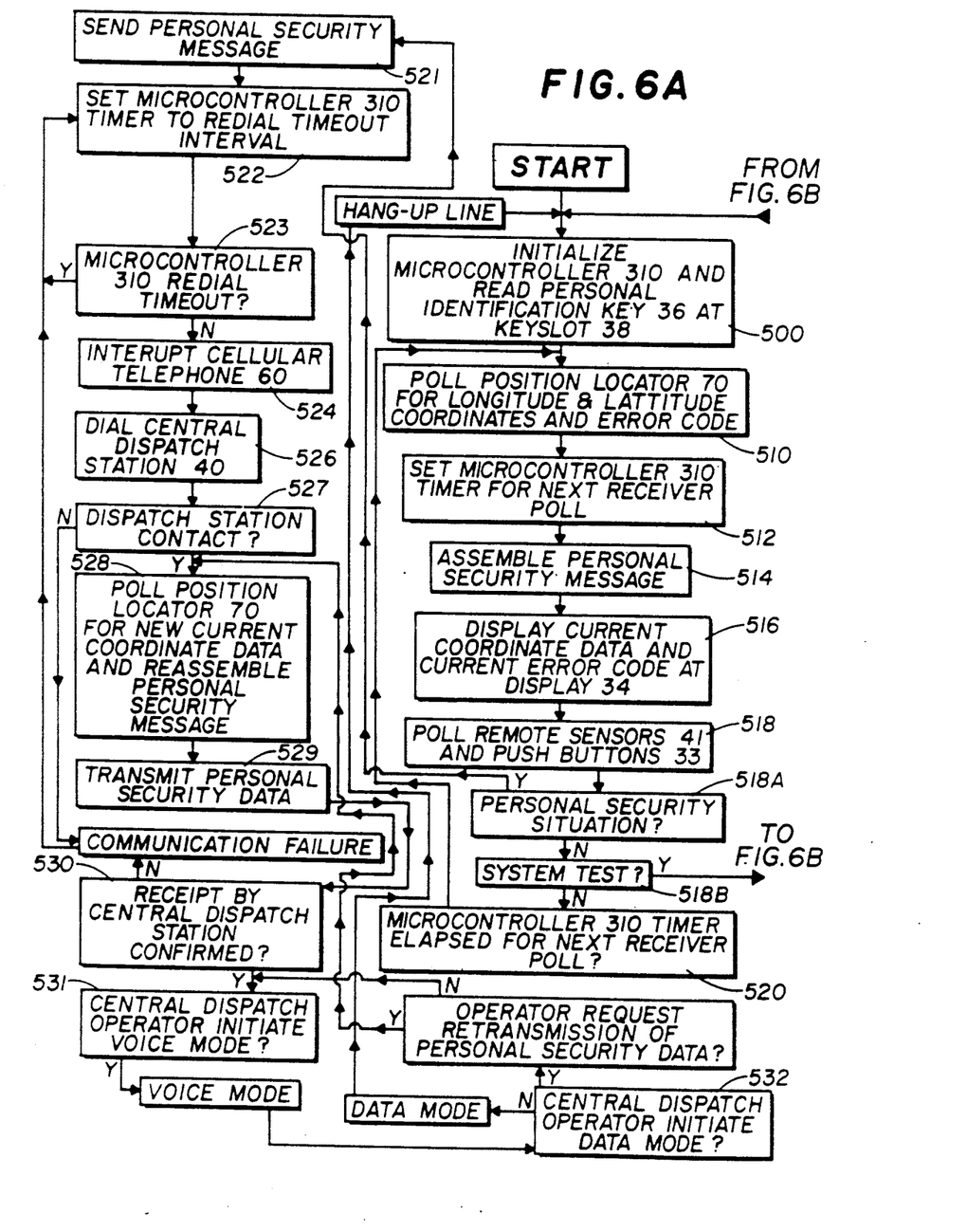
FIG. 6A and 6B show flow-chart showing the preferred operating sequence of the microcontroller 310 of FIG. 4.
Figure 6B:
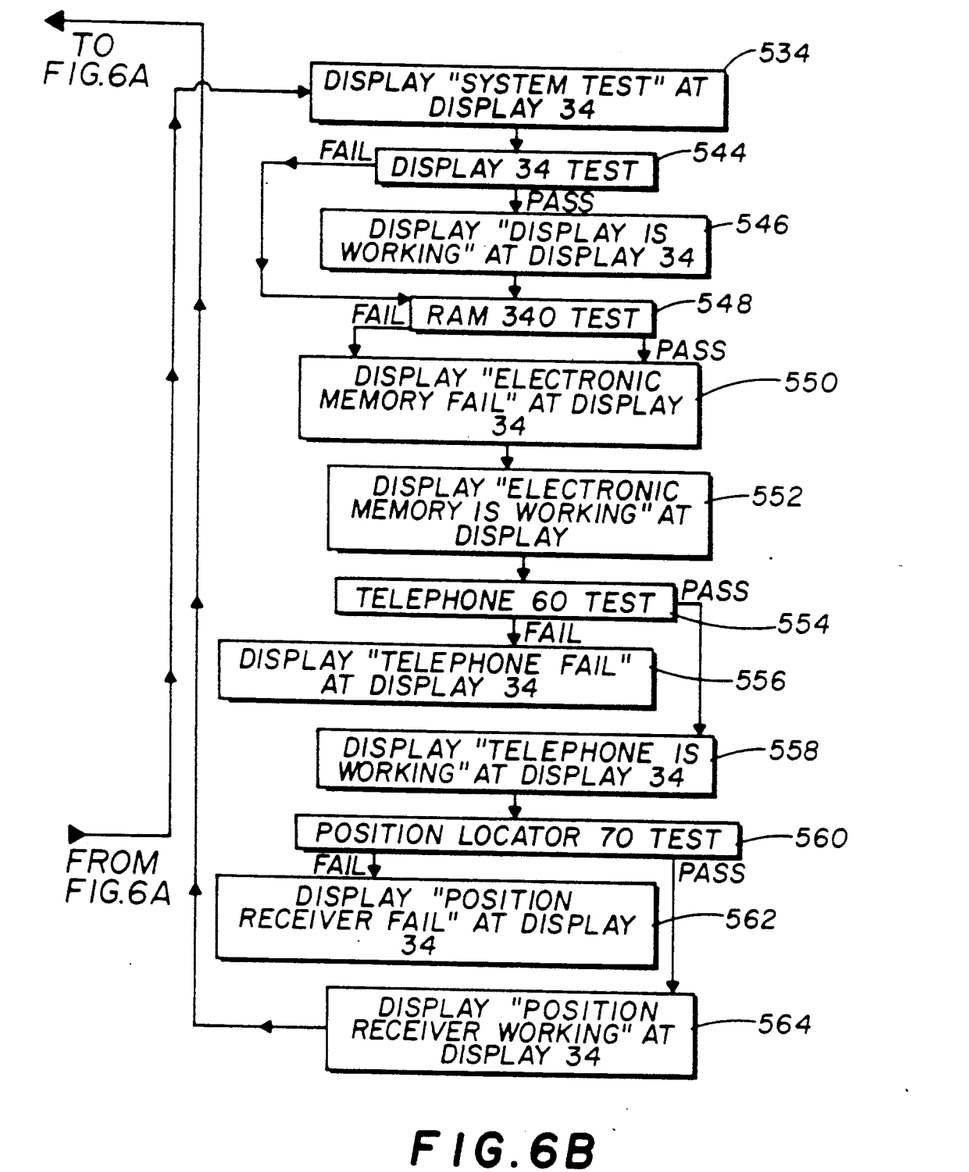

The detailed operation of the preferred embodiment of the personal security system will now be described with reference to the flow-chart of FIG. 6.

In step 500, the system is initialized when a mobile person inserts his or her personal identification key 36 in keyslot 38. Microcontroller 310 enters full security mode and enables keyslot 38 to read all personal information from data key 36. The personal data is transferred to microcontroller 310 where it is stored in an on-board RAM along with vehicle-specific data.

In step 510, the microcontroller 310 polls position locator 70 for new latitude and longitude coordinate data and a reliability rating. Along with each set of coordinate data, conventional LORAN-C and GPS position locators generally provide an indication of the reliability of the coordinates. For example, a JET ® LORAN-C position locator emits a reliability rating ranging from 11 to 88 which represents a progressively deteriorating reliability. It is an essential feature of the present invention that these reliability ratings are put to best use. In the preferred embodiment of the present invention, the raw reliability rating obtained from the position locator 70 is reassigned an error code comprising one of letters A–D. Each time microcontroller 310 polls position locator 70 for new coordinate data and reliability rating, the coordinate data and error code are displayed at display 34 and are transferred to microcontroller 310 where they are stored in the on-board RAM.

In step 512, the microcontroller 310 sets an internal timer to an elapsed time after which the microcontroller 310 will again poll the position locator 70.

The microcontroller 310 repeatedly polls the position locator 70 at an approximate rate of every two seconds in accordance with the internal timer. If desired, the speed and heading of the vehicle may be computed from the accumulated data at each poll.

As shown in step 514, each time the microcontroller 310 obtains new coordinate data and error code from position locator 70, the personal security system message is assembled for transmission to the central dispatch station 40. In the preferred embodiment, the message comprises 128 bytes of data, including the following components:
 current latitude
 current longitude
 current heading
 current speed
 best latitude
 best longitude
 best heading
 best speed
 quality count
 personal identification/account number from personal identification key 36
 system identification/serial number of mobile unit 32
 personal/vehicular security condition code.

The current latitude, current longitude, current heading, and current speed are derived from the most recent polling of position locator 70. The best latitude, best longitude, best heading, and best speed are computed as the most recent values which were obtained along with an "A" error code. Initially, the best values are empty. However, as soon as the current polling is rated an "A" then the current values become the best values. Likewise, at each poll thereafter where the current polling is rated an "A" then the existing best latitude, best longitude, best heading, and best speed are updated to the current latitude, current longitude, current heading, and current speed. Conversely, if the error code of the current polling is less than an "A" rating, then the best latitude, best longitude, best heading, and best speed are not updated. This way, there is always a set of fall-back best values in case the position locator 70 "blinks". In addition, each time that the error code of the current polling is less than an "A" rating, then microcontroller 310 begins a second timer. This elapsed time (beginning when the last best values were obtained) is a "quality count". The quality count is also included in the formatted message to give the central dispatch operator an idea of the trustworthiness of the best coordinate data.

In step 516, the current coordinate data is displayed at display 34.

In step 518, the remote sensors 41 and the push button switches 33 are sequentially polled to determine whether a personal security situation exists or whether system test has been initiated. If neither, and the elapsed time counted at the internal timer has not expired, then the program repeats step 518.

As shown in step 520, if the elapsed time counted at the internal timer has expired, then the program returns to step 510 and the position locator 70 is polled for new coordinate data.

On the other hand, if a personal security situation is detected at step 518A by one of remote sensors 41 or push button switches 33, then the program continues to step 521 where microcontroller 310 attempts to transmit the personal security system message.

At step 522, the microcontroller 310 begins to time a redial interval.

At step 524, the microcontroller 310 causes adapter module 360 to seize control of the cellular telephone 60. This is done even if the cellular phone was already in use.

At step 526, the microcontroller 310 dials the central dispatch station 40. As shown in step 527, if the central dispatch station 40 fails to answer, the redial counter expires and the program returns to step 522. Otherwise, if the central dispatch station 40 answers, then at step 528 the microcontroller 310 again polls position locator 70 for new latitude and longitude coordinate data and the personal security system message is formatted for transmission to the central dispatch station 40.

At step 529, the personal security system message is transmitted.

As shown in step 530, to provide assurance to the vehicle operator, the central dispatch station 40 must acknowledge receipt of the personal security system message or the program returns to step 522. The callback confirmation is indicated on the alphanumeric display device 34.

Once the personal security system message has been transmitted, the central dispatch station 40 decodes the personal security system message and prepares a properly scaled map display with the appropriate emergency symbol superpositioned according to the best coordinate data. An information window is displayed near the emergency symbol to convey all personal information and vehicle-specific information to the dispatch operator.

As shown in step 531, the central dispatch operator may initiate voice mode at any time or, as shown in step 532, may reinitiate data mode.

If system test is initiated at step 518B, then the program jumps to step 534 and the self-test routine illustrated in steps 534–564 is conducted.

Figure 7:
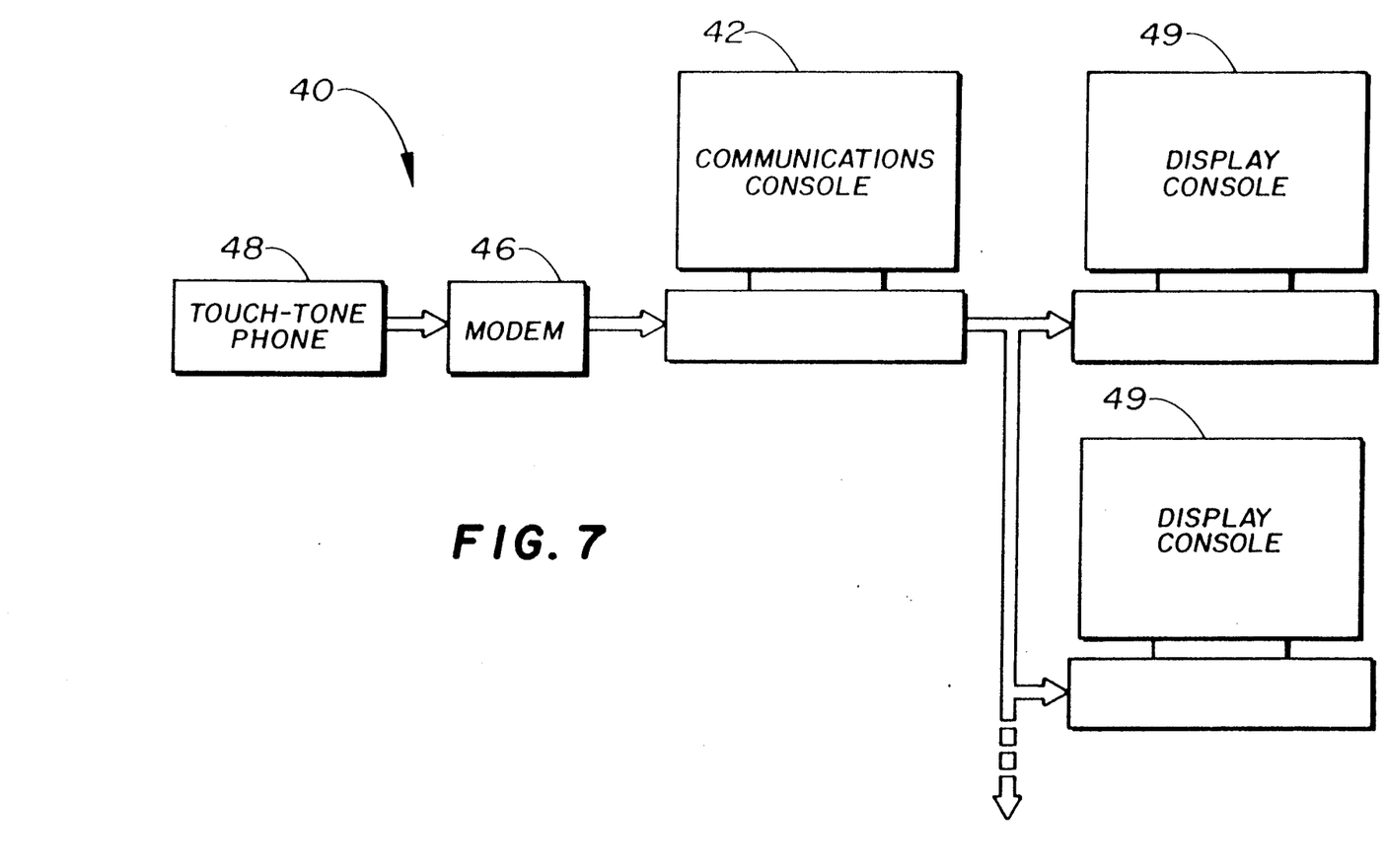
FIG. 7 is a block diagram of central dispatch station 40.

FIG. 7 is a block diagram of the presently preferred embodiment of the central dispatch station 40. The central dispatch station 40 generally comprises a conventional touch-tone telephone 48 connected to a communications console 42, which is in turn connected to one or more display consoles 49. All of the communications console 42 and display consoles 49 may be any commercially available brand of microcomputer which includes a video monitor. Incoming cellular calls from mobile unit 30 are received and logged by communications console 42 via touch-tone telephone 48 and modem 46. The personal security message is decoded and transmitted to display console 49. Numerous display consoles 49 may be networked to a single communications console 42 and incoming personal security messages may be allocated to the appropriate display consoles 49 to accommodate a high frequency of incoming calls. The display console(s) 49 continuously run a conventional digital map program. Preferably, the map program includes the following features:

- capable of displaying detailed geographical area maps complete with street names and addresses;
- capable of real-time plotting of coordinate data at the appropriate position on the map;
- user-controlled zoom function; and
- programmable display windows, symbols, and legend.

A number of suitable map programs incorporating these features are commercially available.

Although the preferred embodiment requires a separate communications console 42 and display console(s) 49, the respective functions of the two consoles may easily be accomplished in a single microcomputer by multi-tasking.

Figure 8:
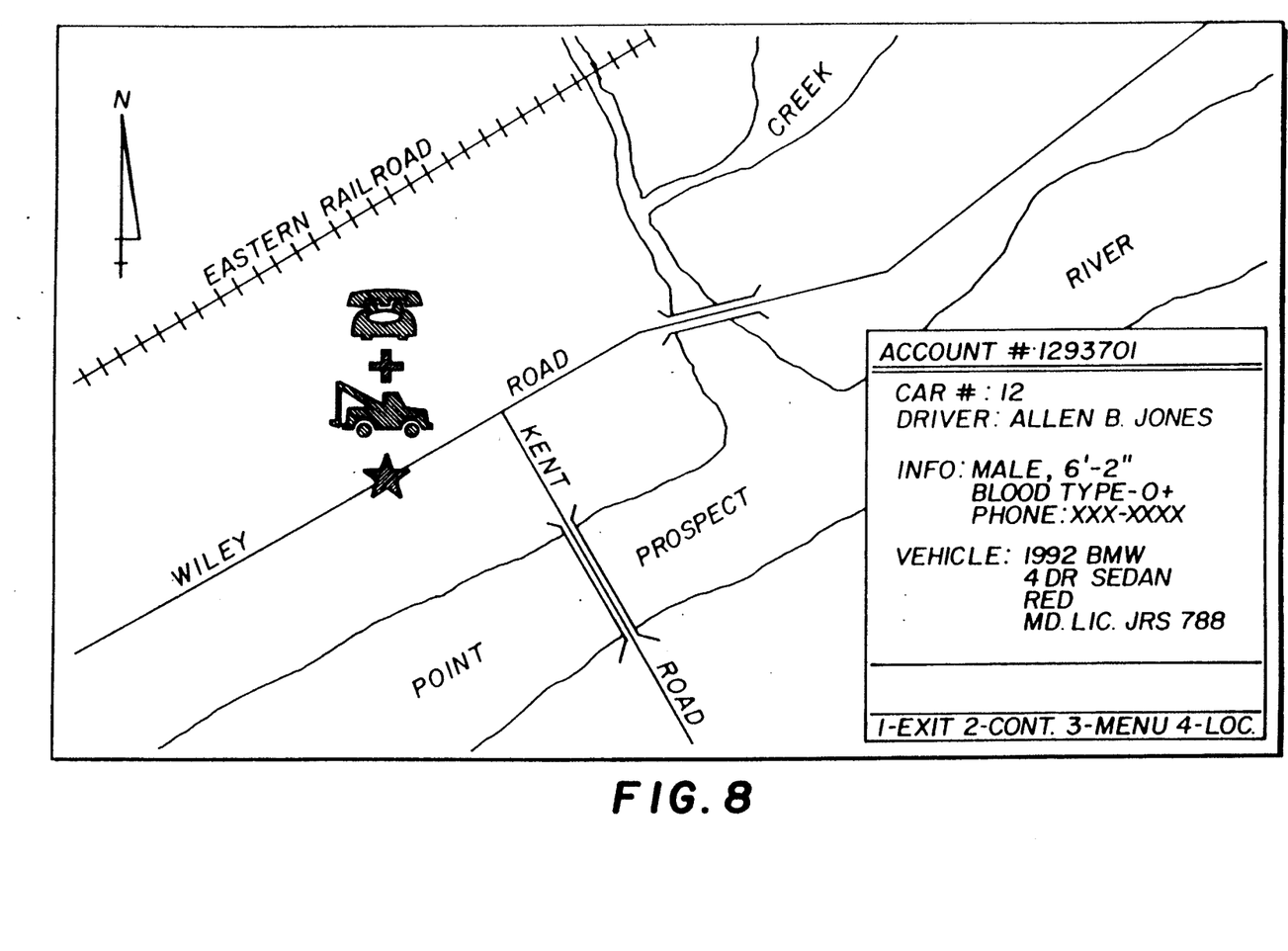
FIG. 8 is an illustration of a display output from the display console 49 of central dispatch station 40.

FIG. 8 is a detailed illustration of the display which appears at display console 49. The alarm symbol corresponding to the type of emergency assistance required is superimposed on the map at the position of the mobile entity. For instance, a mobile person signalling difficulty at the corner of Wiley Road and Kent Road would be represented by the appropriate emergency symbol shown at the corresponding position on the map. In addition, the vehicle subscriber account number, the vehicle make and model, the license number, and any relevant personal or vehicle-specific supplemental information is superposed next to the emergency symbol. The central dispatch station operator immediately contacts the proper authorities as indicated by the emergency symbol, and/or enters voice mode.

By scanning adjacent maps and zooming in on the vehicle position from broader maps of the surrounding areas, the central dispatch station operator is able to direct the authorities to the exact position of the mobile entity 20 by the shortest possible route. In addition, the central dispatch station operator can identify the make, model, and license number of the vehicle to the authorities and can actuate blinking headlights and/or sound the horn via the DTMF 350 and actuator bank 50 in mobile unit 30. The dispatch operator can also provide supplementary information such as special health conditions of the vehicle operator (for instance, diabetes, heart problems, etc.).

Having now fully set forth the preferred embodiments and certain modifications of the concept underlying the present invention, various other embodiments as well as certain variations and modifications of the embodiments herein described will obviously occur to those skilled in the art upon becoming familiar with said underlying concept. It is to be understood, therefore, that within the scope of the appended claims, the invention may be practiced other than as specifically set forth in the disclosure.

We claim:

1. A method for safeguarding the personal security of a particular vehicle operator comprising the steps of:
   storing vehicle identification information in a mobile security assembly which is to be conveyed in a vehicle;
   storing personal information relating to a particular vehicle operator in a data entry device, said personal information including a personal identification as well as other information characteristic of said particular vehicle operator;
   activating said mobile security assembly upon insertion of said data entry device into said mobile security assembly to capture said personal information therefrom;
   determining a coordinate location of said vehicle;
   combining said vehicle identification information, personal information, and coordinate location of said mobile unit in a formatted personal security message;
   triggering said mobile unit upon an occurrence of a personal security condition to establish a communication link with a central dispatch station, and to transmit said personal security message;
   receiving said personal security message at said central station and decoding the type of personal security condition, personal information and vehicle identification information, and coordinate location therefrom;
   displaying a digitized map at said central station;
   correlating said coordinate location of said vehicle to a corresponding point on said digitized map at said central station and indicating said point on said digitized map; and
   superposing the type of personal security condition and said personal and vehicle identification information on said digitized map.

2. The method for safeguarding the personal security of a particular vehicle operator according to claim 1 wherein said vehicle identification information comprises an account number of said vehicle.

3. The method for safeguarding the personal security of a particular vehicle operator according to claim 1 wherein said personal identification information comprises a personal account number.

4. The method for safeguarding the personal security of a particular vehicle operator according to claim 1 wherein said data entry device comprises a data entry key.

5. The method for safeguarding the personal security of a particular vehicle operator according to claim 1 wherein said coordinate location of said vehicle is determined using a LORAN-C receiver.

6. The method for safeguarding the personal security of a particular vehicle operator according to claim 1 wherein said coordinate location of said vehicle is determined using a global positioning satellite receiver.

7. The method for safeguarding safeguarding the personal security of a particular vehicle operator according to claim 1 further comprising the step of initiating a voice mode from said central station to allow two-way voice communication between an operator of said central station and said vehicle operator.

8. A method for safeguarding the personal security of a vehicle operator comprising the steps of:
   storing vehicle identification information in a mobile security assembly which is to be conveyed in a vehicle;
   storing personal identification information relating to particular vehicle operator in a data entry device;
   activating said mobile security assembly upon insertion of said data entry device to capture said personal identification information;
   maintaining a set of "accurate" coordinate values for a location of said vehicle by periodically reading current latitude and longitude coordinate data and a reliability rating from a continuously operating position locator in said mobile security assembly, and comparing each reliability rating with a predetermined threshold rating and updating said set of "accurate" coordinate values with said current latitude and longitude coordinate data when said reliability rating surpasses said predetermined threshold rating;

combining said vehicle identification information, personal identification information, and "accurate" coordinate location of said mobile unit in a formatted personal security message;

triggering said mobile security assembly upon an occurrence of a personal security condition to establish a communication link with a central dispatch station, and to transmit said personal security message;

receiving said personal security message at said central station and decoding the type of personal security condition, personal and vehicle identification information, and "accurate" coordinate values therefrom;

displaying a digitized map at said central station;

correlating said "accurate" coordinate values to a corresponding point on said digitized map at said central station and indicating said point on said digitized map; and superposing the type of personal security condition and said personal and vehicle identification information on said digitized map.

9. An apparatus for monitoring a vehicle operator inside a mobile vehicle comprising:

a mobile security assembly installed in said vehicle, said mobile security assembly further comprising, a mobile unit having a programmable memory containing vehicle-specific information, a keypad for allowing manual indication of an alarm condition, a position locator for providing position coordinates indicating a location of said mobile vehicle, a scanning device for reading data, and a microcontroller connected to said programmable memory, keypad, position locator and scanning device, and a plurality of remote sensors for automatically sensing an alarm condition and indicating said alarm condition to said mobile unit, and data entry means provided with personal information relating to a particular vehicle operator stored thereon, said data entry means being insertable in said scanning device;

whereby insertion of said data entry means into said scanning device prompts said scanning device to read said personal information therefrom;

said microcontroller being triggered by a personal security situation indicated at one of said keypad and remote sensors to input said position coordinates from said position locator and to format a security message comprising said alarm condition, vehicle-specific information, personal information and said position coordinates, and a portable communication device connected to said mobile unit and conveyed therewith for transmitting said security message to a central dispatch station; and a central dispatch station, said central dispatch station further comprising, a central communication console for receiving said security message from said mobile security assembly and decoding said personal information and vehicle-specific information, position coordinates, and alarm condition from said security message;

a display console connected to said central communication console for correlating said position coordinates to a digital map, and for displaying said digital map to a central operator with said identification information, position coordinates, and alarm condition indicated thereon.

10. The apparatus for monitoring a vehicle operator in a mobile vehicle according to claim 9 wherein said plurality of remote sensors includes any one from among the group of collision sensor, theft sensor, medical condition sensor and vehicle malfunction sensor.

11. The apparatus for monitoring a vehicle operator in a mobile vehicle according to claim 9 wherein said mobile unit further comprises a plurality of actuators connected between the vehicle wiring and said microcontroller, said actuators being actuable from said central dispatch station for allowing remote control of selected vehicle functions.

12. The apparatus for monitoring a vehicle operator in a mobile vehicle according to claim 11 wherein said plurality of actuators include an actuator for flashing vehicle headlights and an actuator for sounding a vehicle horn, said actuators being actuable from said central dispatch station to assist in directing an emergency response to said vehicle.

13. The apparatus for monitoring a vehicle operator in a mobile vehicle according to claim 12 wherein said plurality of actuators include an actuator for initiating an electromagnetic beacon, said actuator being actuable from said central dispatch station to assist in directing an emergency response to said vehicle.

14. The apparatus for monitoring a vehicle operator in a mobile vehicle according to claim 9 wherein said keypad further comprises a plurality of push buttons for signalling a personal security situation, a push button for confirming an indication of a personal security situation, and a push button for initiating a self-test of said personal security assembly.

15. The apparatus for monitoring a vehicle operator in a mobile vehicle according to claim 14 wherein said mobile unit further comprises an indicator light proximate each of said push buttons for signalling when said push buttons have been depressed.

16. The apparatus for monitoring a vehicle operator in a mobile vehicle according to claim 14 wherein said mobile unit further comprises an audible alarm for sounding when any one of said push buttons have been depressed.

17. The apparatus for monitoring a vehicle operator in a mobile vehicle according to claim 9 wherein said position locator is a LORAN-C receiver.

18. The apparatus for monitoring a vehicle operator in a mobile vehicle according to claim 9 wherein said position locator is a global positioning satellite receiver.

19. The apparatus for monitoring a vehicle operator in a mobile vehicle according to claim 17 wherein said portable communication device connected to said mobile unit is a cellular telephone.

20. The apparatus for monitoring a vehicle operator in a mobile vehicle according to claim 17 wherein said portable communication device connected to said mobile unit is a satellite transceiver.

21. The apparatus for monitoring a vehicle operator in a mobile vehicle according to claim 17 wherein said mobile unit further comprises means for initiating a voice mode from said central dispatch station to allow said central dispatch operator to communicate verbally with said vehicle operator.

22. The apparatus for monitoring a vehicle operator in a mobile vehicle according to claim 21 wherein said portable communication device is a conventional cellular telephone comprising a handset and transceiver, and said mobile unit further comprises an adapter module connected between said handset and transceiver for adapting said conventional cellular telephone for use as as said portable communication device.

23. The apparatus for monitoring a vehicle operator in a mobile vehicle according to claim 22 wherein said mobile unit further comprise a plurality of actuators connected between the vehicle wiring and said microcontroller, said actuators being actuable from said central dispatch station for allowing remote control of selected vehicle functions.

24. The apparatus for monitoring a vehicle operator in a mobile vehicle according to claim 23 wherein said mobile unit further comprises a Dual Tone Multifrequency device connected between said adapter module and said plurality of actuators for allowing said central dispatch operator to control said vehicle functions by transmitting tones to said mobile unit.

25. The apparatus for monitoring a vehicle operator in a mobile vehicle according to claim 23 wherein said plurality of actuators include an actuator for flashing vehicle headlights and an actuator for sounding a vehicle horn, said actuators being actuable from said central dispatch station to assist in directing an emergency response to said vehicle.

26. A method for safeguarding the personal security of a vehicle operator comprising the steps of:
    equipping a vehicle with a mobile security assembly comprising a communication device, a position locator for determining a current position, and a mobile unit connected between said communication device and position locator;
    storing vehicle identification information in said mobile unit;
    storing supplemental information at a central dispatch station,
    capturing personal identification information including a personal account number of said vehicle operator in said mobile unit by reading said personal identification information from a data storage device inserted in said mobile unit by said vehicle operator;
    triggering said mobile unit upon an occurrence of a personal security condition to determine a current position of said vehicle, to establish a communication link with said central dispatch station via said communication device, and to transmit a personal security message indicating said personal security condition, said personal and vehicle identification information, and said current position;
    receiving said personal security message at said central station and decoding said personal security condition, personal identification information, and current position therefrom;
    displaying a digitized map at said central station;
    correlating said current position of said vehicle to a corresponding point on said digitized map at said central station and indicating said point on said digitized map;
    correlating said supplemental information to said personal and vehicle identification information; and
    superposing said personal security condition, said personal and vehicle identification information, and said supplemental information on said digitized map.

27. The method for safeguarding a mobile entity according to claim 26, wherein said supplemental information further comprises any one from among the following: medical information relating to said vehicle operator, physical characteristics of said vehicle operator, and people to contact in an emergency.

* * * * *